Feb. 3, 1959 F. G. STEELE 2,872,106

TAPE CAM COMPUTER SYSTEM

Filed April 3, 1950 5 Sheets-Sheet 1

INVENTOR:
FLOYD G. STEELE

BY Herbert E. Metcalf

HIS PATENT ATTORNEY

Feb. 3, 1959 F. G. STEELE 2,872,106

TAPE CAM COMPUTER SYSTEM

Filed April 3, 1950 5 Sheets-Sheet 2

INVENTOR:
FLOYD G. STEELE

BY Herbert E. Metcalf
HIS PATENT ATTORNEY

Feb. 3, 1959 F. G. STEELE 2,872,106

TAPE CAM COMPUTER SYSTEM

Filed April 3, 1950 5 Sheets-Sheet 3

INVENTOR:
FLOYD G. STEELE

BY Herbert E. Metcalf

HIS PATENT ATTORNEY

Feb. 3, 1959 F. G. STEELE 2,872,106

TAPE CAM COMPUTER SYSTEM

Filed April 3, 1950 5 Sheets-Sheet 4

INVENTOR:
FLOYD G. STEELE

BY Herbert E. Metcalf

HIS PATENT ATTORNEY

INVENTOR:
FLOYD G. STEELE
BY Herbert E. Metcalf
HIS PATENT ATTORNEY

United States Patent Office 2,872,106

Patented Feb. 3, 1959

2,872,106

TAPE CAM COMPUTER SYSTEM

Floyd G. Steele, Manhattan Beach, Calif., assignor to Northrop Aircraft, Inc., Hawthorne, Calif., a corporation of California Application April 3, 1950, Serial No. 153,742

11 Claims. (Cl. 235—61)

This invention relates to computers and more particularly to computers for generating relatively complex functions from a plurality of tapes recorded with simpler functions.

In control systems, for example, for automatic navigation of missiles, it is desirable to maintain a steady flight according to star navigational functions fed into the control mechanism. These instructions may be expressed in the form of a mathematical equation. Hence, these equations must be computed and their solution obtained in a form of properly spaced electrical pulses which can be fed into the electrical control mechanisms that operate to physically establish the desired relationship between components of the system, for example.

It can be shown mathematically that many relatively complex functions can be derived by combining a plurality of relatively simple functions. One example of such a complex function is a useful star navigational function which can be employed as above described for controlling a missile along a great circle path, at a constant speed and altitude. This function expresses the altitude angle of a star to be made good by a missile moving along this path. By specifying different sets of parameters for this particular navigational function, for example, a family of specified trajectories can be obtained. The present invention shows how a single flexible system of tape recordings, referred to hereinafter as tape cams, can be employed for generating any one of the trajectories in the family. The particular trajectory chosen being obtained by initially setting the individual tape cams so as to introduce the desired parameters.

It is therefore an object of this invention to provide a tape computer which can generate relatively complicated mathematical expressions by means of tape recorded cams of simpler functions.

It is another object of this invention to provide a computer for generating a solution to a complex mathematical function in a form useful for feeding into control mechanisms.

It is another object of this invention to provide a flexible tape computer which permits an easy and accurate means for introducing coefficients into a solution by initial off-setting of the individual tape cams.

It is still another object of this invention to provide a computer which will generate desired star navigational functions.

Broadly stated, the present invention is comprised of a plurality of recorded mediums, such as tapes. Each tape is recorded with properly spaced discrete signals which are capable of being sensed and of ultimately effecting cam-like action; consequently the invention herein disclosed is referred to as a tape-cam computer. The length of the medium traversed is made proportional to the independent variable and the number of discrete signals recorded in that length is made proportional to the dependent variable. Each recorded tape cam is driven at a controlled rate past an associated scanning head which is adapted to sense the discrete signals recorded thereon and convey the resulting electrical effect to a positive and negative output channel. The summation of the signals emitted on both these channels is proportional to the numerical value of the function being generated.

Means are provided for interconnecting these tape cam recordings in series or in parallel, i. e., feeding the output of one or more into the drive inputs of others. By initially off-setting the tapes relative to their associated scanning heads, particular solutions to complicated functions, made up of the simpler functions recorded on the tapes, can thus be generated.

This invention possesses numerous other objects and features, some of which, together with the foregoing, will be set forth in the following description of a preferred embodiment of the invention.

Figure 3:
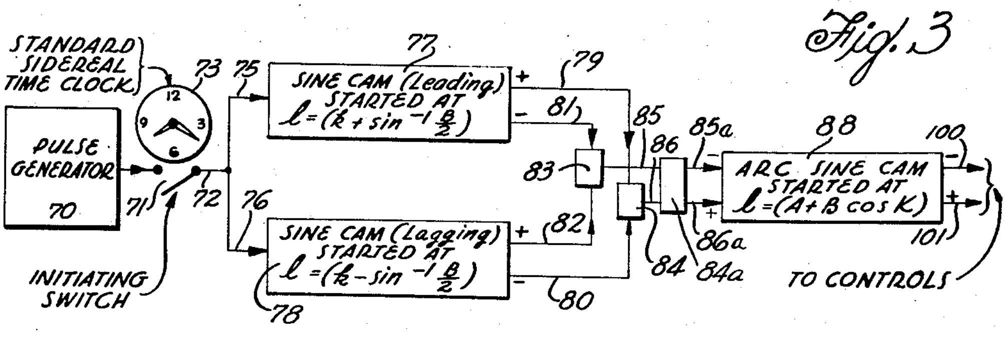
Figure 3 is a schematic block diagram showing how several single tape cam recorders are connected together to generate a complex function.
Figure 3A:
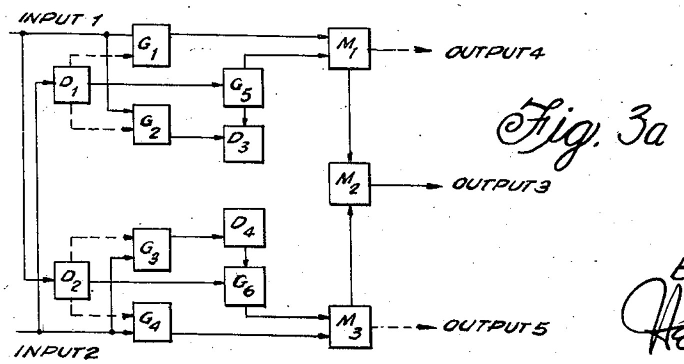

Figure 3*a* is a block diagram illustrating operation of anti-coincidence devices shown in Figure 3.

Figure 4:
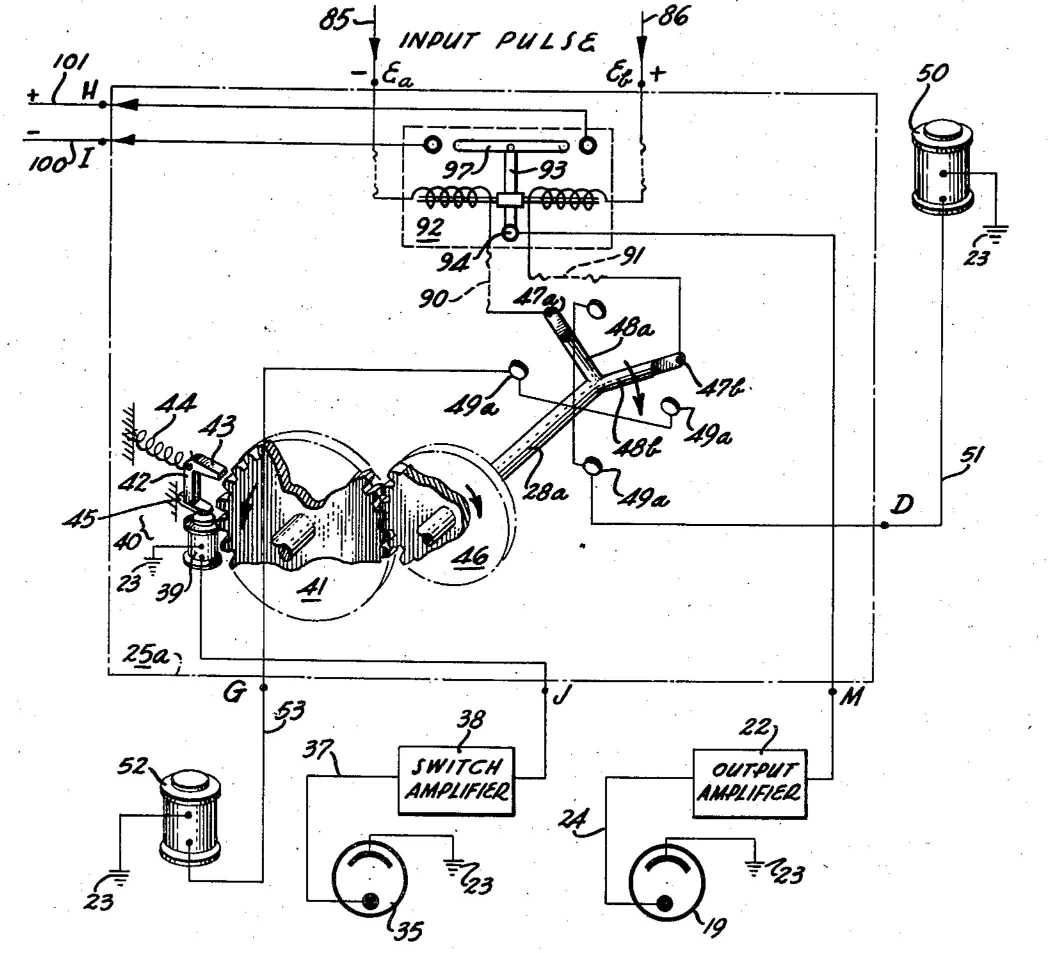

Figure 4 is a perspective illustration of the arc sine relay used in conjunction with the arc sine tape cam recorder.

Figure 5:
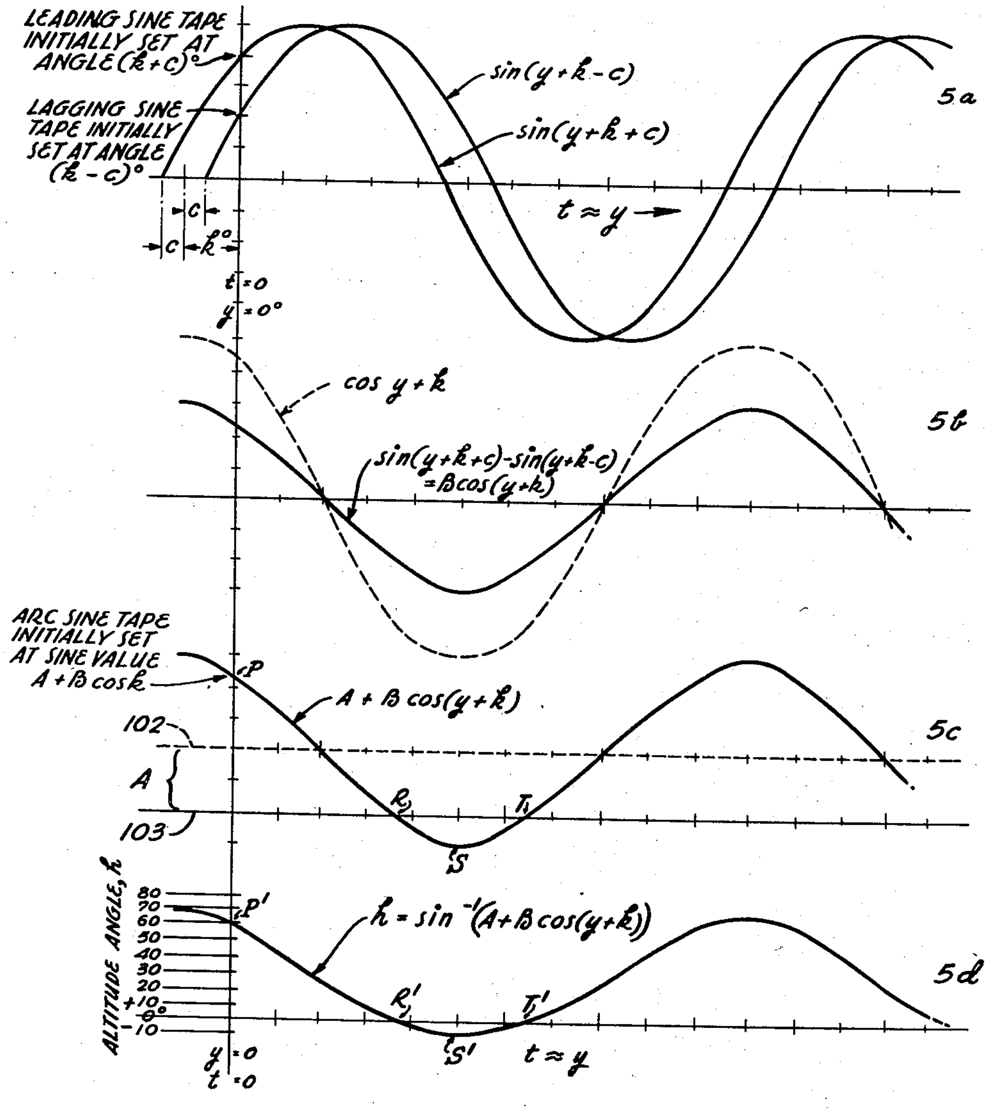

Figure 5 is a chart showing graphically the manner in which a particular complex function is built up by the initial off-setting of the tape-cams with respect to their output devices.

Figure 6:
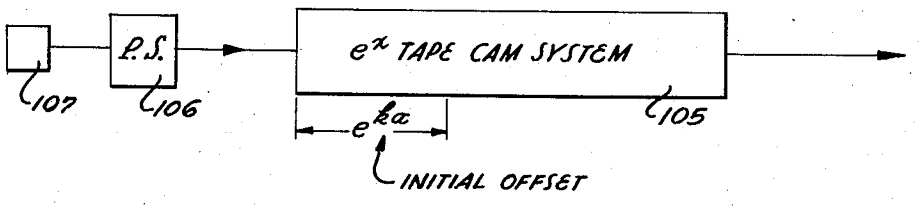

Figure 6 is a schematic illustration showing how the coefficient of an exponential function can be introduced by initially off-setting its tape cam.

Figure 7:
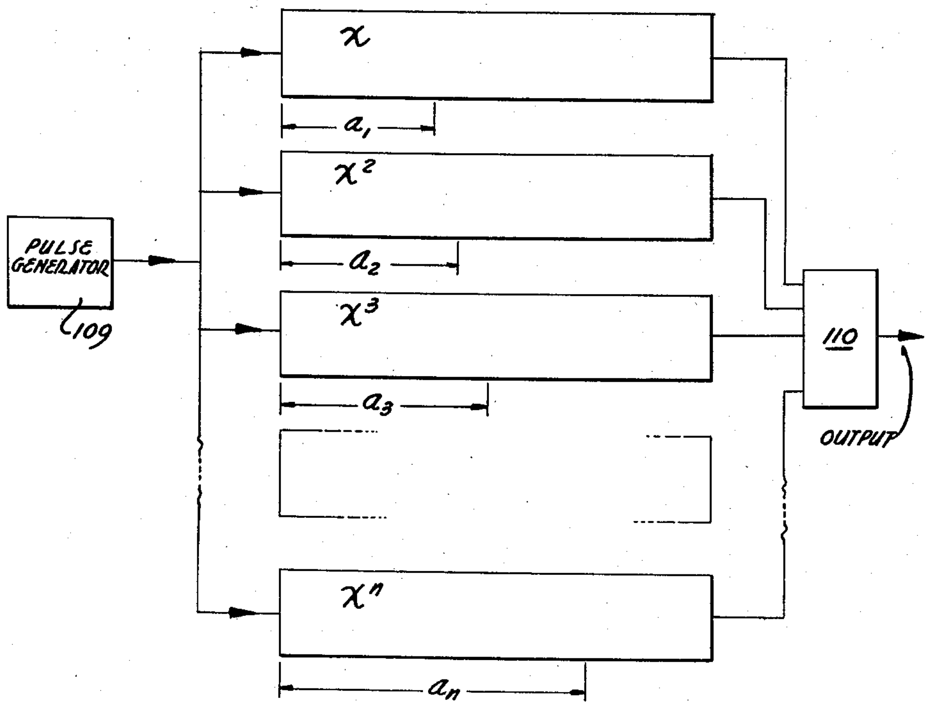

Figure 7 is a schematic block diagram of the arrangement of a general tape cam computer for solving power series functions.

Figure 1:
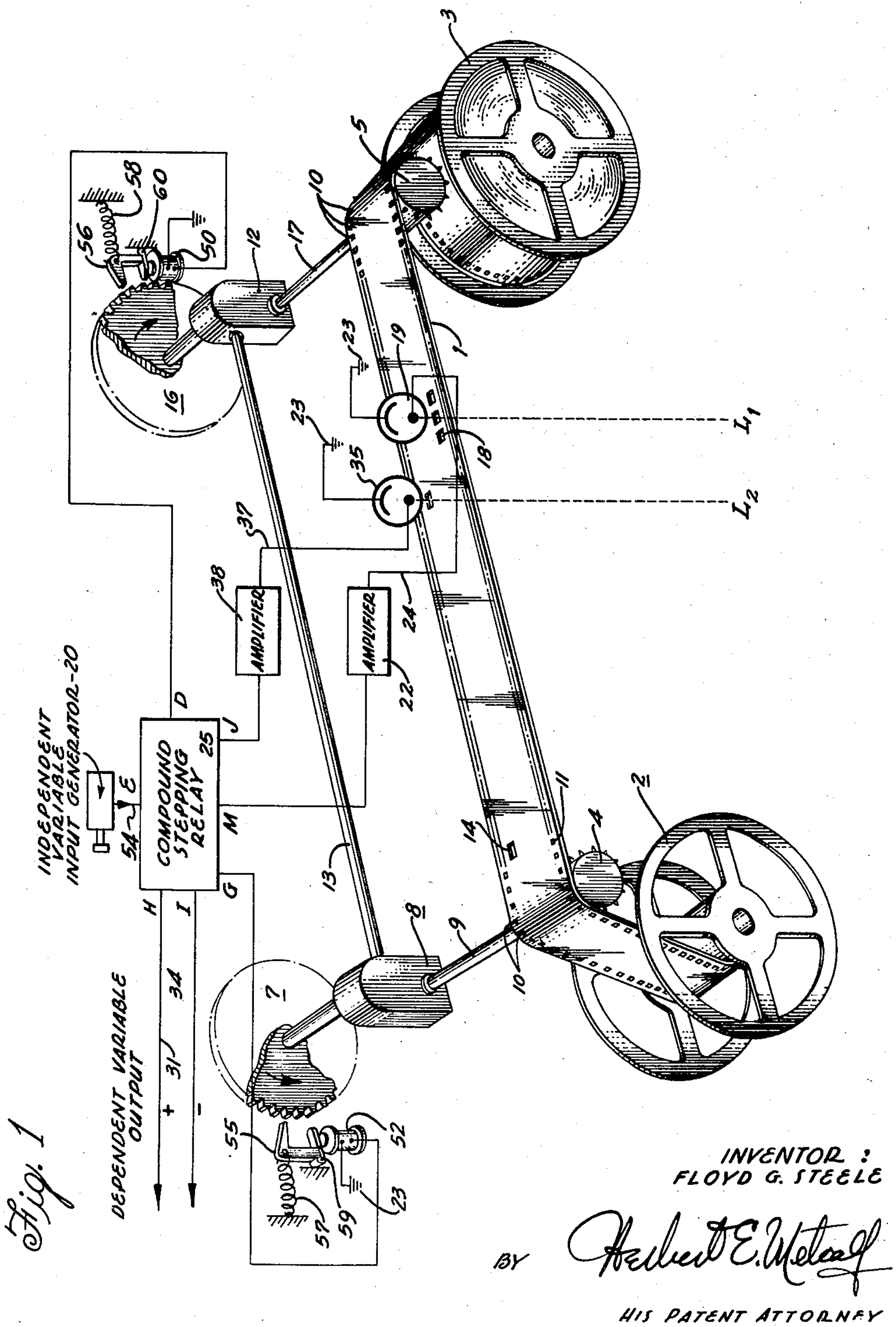
Figure 1 is a perspective, diagrammatic illustration of a single tape cam recorder together with a wiring diagram of certain parts thereof.

Referring first to Figure 1, a schematic perspective diagram showing a single tape cam system is presented. Here tape cam 1, which may be standard 35 mm. movie film, for example, is provided with front and rear conventional take-up reels 2, 3. These reels are arranged to pass the tape cam 1 over the span formed by front and rear drive sprockets 4 and 5, respectively.

Front drive sprocket 4 is connected to a front stepping gear 7 through a front gear box 8 and a front sprocket shaft 9. Front drive sprocket 4 has a row of sprocket teeth 10 disposed around the circumference thereof at each end to mesh with sprocket holes 11 in the tape cam 1. Front gear box 8 also has a right angle drive which is connected to an associated rear gear box 12 by means of a link shaft 13. Link shaft 13 is parallel to the longitudinal span of the tape cam 1 and affords positive drive between the front and rear drive sprockets 4 and 5.

A rear stepping gear 16 rotates rear drive sprocket 5, through rear gear box 12 and rear sprocket shaft 17. Rear drive sprocket 5 has teeth thereon, similar to those on the front drive sprocket 4, also meshing with sprocket holes 11 of tape cam 1. Thus, by means to be shown hereafter, the rear stepping gear 16 provides a positive forward incremental drive of tape cam 1 and the front stepping gear 7 provides a positive backward incremental drive of tape cam 1.

Tape cam 1 is punched with a row of information or function holes 18. These holes are placed on the tape cam 1 at predetermined intervals depending on the information they represent. For the particular tape embodiment to be described in detail, the information holes 18 are spaced in the tape cam in such a manner so as to represent the sine of an angle, and the length of the tape cam traversed corresponds to the size of this angle. It should be noted that each information hole 18 corresponds to a fixed increment of the sine and the holes are positioned along said tape cam in accordance with the rate of change of the sine.

Disposed approximately in the middle of the span of the tape cam 1 and supported slightly above the center line of the row of information holes 18 is a function output photocell 19. A source of light $L_1$ is positioned below the tape cam 1 and is directed to focus its light rays onto the function output photocell 19. As the tape cam is progressed along its span, the function output photocell 19 becomes momentarily energized any time an information hole 18 permits the light rays to impinge thereon. This resulting pulse from output photocell 19, one terminal of which connects to ground 23, is sent through output circuit 24 containing output amplifier 22 to terminal M of compound stepping relay 25.

Figure 2:
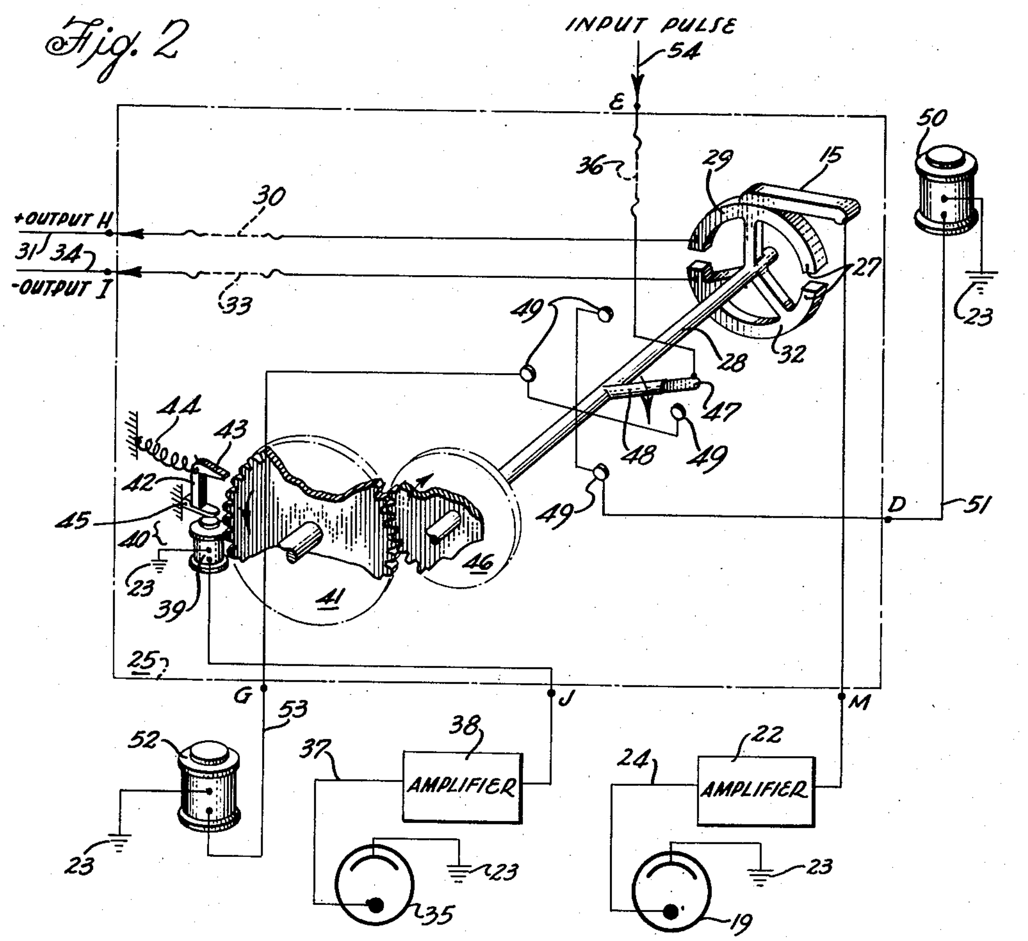
Figure 2 is a perspective illustration of the sine relay used in the embodiment of Figure 1 together with its accompanying wire diagram.

As shown in Figure 2 terminal M of the sine tape cam compound stepping relay 25 is connected to a brush 15 held against a commutator ring 27. Commutator ring 27 is secured to rotate with stepping relay shaft 28. Top half 29 of the commutator ring 27 is connected at terminal H by a flexible portion 30 which is, in turn, connected to a positive output channel lead 31 of the sine tape cam system. Bottom half 32 of the commutator ring 27 is connected at terminal I by a second flexible position 33 which is, in turn, connected to a negative output channel lead 34 of the sine tape cam system.

Assuming it is desired to compute the sine of an angle up to 360°, as in the embodiment of this particular tape cam system, in order to save tape it is only necessary that the information holes in the tape cam be spaced to represent the sine of an angle from 0° to 90°. The tape cam 1 can then be reversed and will furnish sine values between 90° and 180° by playing backward. To provide the appropriate outputs the tape cam 1 is reversed again at 180° and 270°. It should be pointed out here that use of an intermittent drive allows these reversals without loss of time.

The reversal of the direction of the tape cam 1 at 90° and 270° is accompanied by the reversal of the output pulse to the opposite output channel. Consequently, the algebraic sum of the pulses on the positive and negative channel output leads 31 and 34 will give the value of the sine of the angle at any instant.

Referring again to Figure 1, a second photocell, designated the switch photocell 35, is provided to effect this required reversal of tape direction and output sign. Switch photocell 35 is disposed above the tape cam 1 adjacent to output photocell 19, and on a line between two terminating holes 14 placed at each end of the tape cam representing 0° and 90°. A second light source $L_2$, positioned below the tape cam 1, momentarily energizes switch photocell 35, one terminal of which leads to ground 23, whenever a terminating hole 14 passes between the second light source $L_2$ and switch photocell 35; the resulting electrical pulse is sent through a switch amplifier 38 contained in switch circuit 37, to terminal J of compound stepping relay 25. Referring to Figure 2, this pulse is clearly shown to energize relay solenoid 39. The other terminal of relay solenoid 39 leads to ground 23.

A relay pawl 40 is located above relay solenoid 39 and on the side of relay stepping gear 41. Relay pawl 40, comprised of relay arm 42 and relay finger 43, is normally held in a disengaged position away from the teeth of relay stepping gear 41 by means of relay spring 44. However, when the relay solenoid 39 becomes energized it pulls the relay pawl 40 in a downwardly direction angularly about a pawl pivot 45.

This action causes the relay pawl 40 to engage a tooth on relay stepping gear 41 and to rotate the relay stepping gear so that relay shaft gear 46, meshing therewith, will rotate a quarter turn. Contact end 47 of relay switch arm 48, rigidly linked to rotate with relay shaft gear 46, will thus revolve clockwise to the next of four equally spaced stationary contacts 49 of the compound stepping relay 25. Alternate stationary contacts of this arrangement are interconnected. Then terminal D, of one pair of stationary contacts, is connected to rear drive solenoid 50 by rear drive solenoid lead 51. Terminal G, of the other pair of stationary contacts, is connected to front drive solenoid 52 by front drive solenoid lead 53. Both front and rear drive solenoids are connected to ground 23.

The single sine tape cam system input lead 54 is connected to terminal E which is connected through a flexible portion 36 to relay switch arm 48. Hence, it is clear that the energizing of the switch photocell 35 by the light rays of light source $L_2$ passing through a terminating hole 14 in the moving tape cam 1 results in the sine tape cam system input lead 54 switching to energize the opposite drive solenoid.

The energizing of either the front or rear drive solenoids 52 or 50 (Figure 1) causes its associated drive pawls 55 and 56, normally restrained free from the teeth of stepping gear 7 and 16 by springs 57 and 58, to be pivoted about axis 59 and 60, respectively, engaging a tooth of drive stepping gear 7 or 16, and thus driving the tape cam 1 a given fixed incremental distance. In this embodiment, information holes 18 are punched on the tape cam 1 in relation to the incremental drive, so that the focal point of light source $L_1$ impinges through the information holes 18 on the tape cam 1 when the tape cam is stopped and passes between the information holes when the tape cam is in motion.

Referring again to compound stepping relay 25 in Figure 2, the angular relationship of the four stationary contacts 49 to the top and bottom half 29 and 32 of commutator ring 27 is such that a 180° rotation of the stepping relay shaft 28, or two activations of switch photocell 35, will switch the pulse resulting from the activation of output photocell 19 into the opposite sine tape cam system output channel.

The operation of a single sine tape generator is as follows: Assume the sine generator is initially set at a zero angle and indicates the required zero sine value. Pulse generator 20, which is the independent variable actuator, generates properly formed pulses at a standard frequency. These input pulses, each pulse representing, for example, six seconds of arc, are fed through compound stepping relay 25 to actuate the rear drive solenoid 50 to move the tape incrementally forward past the function output photocell 19. The output photocell 19 becomes energized every time an information hole 18 passes and sends the resulting electrical pulse, representing a sine increment, for example, of $2.9\times10^{-5}$, through compound stepping relay 25 to the positive output channel lead 31. When the tape has moved through a length corresponding to 90°, the switch photocell 35 becomes momentarily energized by light rays from source $L_2$ impinging through terminating hole 14. The relay switch arm 48 of compound stepping relay 25 thus is caused to rotate a quarter turn. The input pulse to the sine generator is now switched to actuate the front drive solenoid 52 to move the tape incrementally backward past the function output photocell 19. Simultaneously with this reversal in direction of the movement of the tape, the output pulses from function output photocell 19 are switched, by means of commutator ring 27, from feeding into the positive output channel lead 31, which at this instant is recording a sine value of plus one, to feed into the negative output channel lead 34. Hence, the algebraic sum of these two output channels, representing the numerical value of the sine, gradually decreases in magnitude to zero as the tape moves through a length corresponding to an angle from 90° to 180°. At 180°, the switch photocell 35 is again energized by the passing of a terminating hole 14, the stepping relay shaft 28 of compound stepping relay 25 rotates another quarter turn reversing the direction of travel of the tape. The function output photocell 19, however, continues to send pulses to the negative output channel 34 which gradually builds to record a value of minus one at 270°. At 270° both reversal of the direction of the tape cam and reversal of the output channels is effected by the switch photocell 35 to give the value of the sine to 360°.

This concludes the detailed description of a single tape cam system for generating, in particular, the sine function. The tape cam and associated means so far presented are not a part of the present invention except in combination therewith. This single tape cam system was previously shown, described, and claimed in the co-pending application of Floyd G. Steele, Serial No. 51,563, filed September 28, 1948, now Patent No. 2,732,504, entitled "Linear Cam Computer."

Referring to Figure 3, a schematic block diagram illustrates how a plurality of single tape cam systems, each similar to the tape cam system described above and recorded with a relatively simple function, can be connected so as to generate a relatively complex function. The particular complex function to be generated by the set-up shown is the star navigational function:

$$h=\sin^{-1}[A+B\cos(y+k)]$$

where
$h$=altitude angle
$A$=a first parameter
$B$=a second parameter
$y$=an angle≈time
$k$=initial angle The trajectory represented by the above equation is an approximation to a great circle course between the point of departure and the point of destination of a craft which is desired to be controlled between these points.

The equation assumes a constant velocity, constant altitude and, because of approximations, a vertical termination dive.

In Figure 3, showing the particular set-up for generating this equation, an electronic pulse generator 70 of standard frequency is connected through an initiating switch 71 to an actuating lead 72. A clock 73, running on sidereal time, closes this initiating switch 71 at some predetermined time, i. e., the time at which the angle generated by the tape cam computer, which is being described, corresponds to the altitude angle of the given star at the point on a trajectory where automatic celestial navigation is to commence. The closing of initiating switch 71 sends a steady stream of discrete signals, representing the independent variable, through parallel circuits 75 and 76 comprised of a leading sine cam system 77 and a lagging sine cam system 78, respectively. The combined output of these parallel circuits feeds into an arc sine cam system 88 whose output is the desired altitude angle.

A positive channel output 79 of the leading sine cam system 77 is joined through a first anti-coincidence device 84 with a negative channel output 80 of the lagging sine cam system 78. The combined pulses of these two channels are then fed through a third anti-coincidence device 84*a* to the arc sine cam system 88 by means of third anti-coincidence positive input channel 86 and arc sine positive input channel 86*a*. Likewise, a negative output channel 81 of the leading sine cam 77 is joined through a second anti-coincidence device 83 to a positive output channel 82 of the lagging sine cam 78, the junction of these latter leads is fed through the third anti-coincidence device 84*a* to the arc sine cam system 88 by means of third anti-coincidence negative input channel 85 and arc sine negative input channel 85*a*. The pulse output of the arc sine cam system 88, representing the measure of the star altitude angle of the specified trajectory at a given sidereal time, is thus available for feeding into the control mechanisms of the navigational system.

It is the function of first and second anti-coincidence devices 83 and 84, respectively, to assure that two pulses are not applied simultaneously to any one input line. It is the function of third anti-coincidence device 84*a* to assure that two input pulses are not simultaneously applied to arc sine cam 88 via positive and negative input channels 86*a* and 85*a*, respectively.

The operation of anti-coincidence devices 83, 84, and 84*a* may be more clearly understood by reference to Figure 3*a*. Figure 3*a* shows two input channels leading into a system of circuit elements designated $G_1$–$G_6$, $D_1$–$D_4$, and $M_1$–$M_3$. Circuit elements $D_1$–$D_4$ are monostable devices which trigger in one direction as the response to an input pulse and after a short time delay, return to their stable position; circuit elements $D_1$–$D_4$ are widely known in the art as "one-shot" multivibrators; circuits $G_1$–$G_6$ are devices of the same general nature as the "one-shot" multivibrators with the exception that they have two input channels and can be used as gate devices, wherein one pulse may permit or inhibit the passage of an immediately following pulse. Circuit elements $M_1$–$M_3$ are mixing devices which take two inputs and transmit them in character along a single output channel.

The operation of the anti-coincidence device is as follows: Gates $G_1$ and $G_4$ are normally open, gates $G_2$ and $G_3$ are normally closed. Each time an input pulse occurs in input 1, "one-shot" multivibrator $D_2$ is triggered, and the output pulse of "one-shot" multivibrator $D_2$ in turn opens gate $G_3$ and closes gate $G_4$, both of said gates being open and closed, respectively, for the duration of said output pulse. If no pulse occurs in input 2 during the duration in time of said output from "one-shot" multivibrator $D_2$, nothing else occurs and the input pulse on input 1 is transmitted via gate $G_1$ and mixers $M_1$ and $M_2$ to the output 3. If a pulse does appear on input 2 during the duration of said output pulse from "one-shot" multivibrator $D_2$, it passes through gate $G_3$ and triggers "one-shot" multivibrator $D_4$. The output pulse from $D_4$ in turn opens gate $G_6$ for a given duration of time, said duration of time being equal to the duration in time of the output pulse from $D_2$ and sufficient to permit the passage of the pulse which is produced from the trailing edge of the output pulse from "one-shot" multivibrator $D_2$. The trailing edge output pulse from "one-shot" multivibrator $D_2$ after passing through gate $G_6$ is sent to the output 3 via mixers $M_3$ and $M_2$. The net effect of this process is to produce two output pulses on output 3, said output pulses having a separation in time equal to the duration in time of the output pulse from "one-shot" multivibrator $D_2$. Since the circuit, as shown in Figure 3, is symmetrical, a pulse arriving in input 1, which follows a pulse in input 2, will also be delayed a duration in time equal to the duration in time of the output pulse from "one-shot" multivibrator $D_1$.

The description above is directly pertinent to anti-coincidence devices 83 and 84. It is readily seen that the device is converted into anti-coincidence device 84*a* by the elimination of mixer $M_2$ and the utilization of outputs 4 and 5. Used as anti-coincidence device 84*a*, series of input pulses on output 1 will produce an equivalent series of output pulses on output 4, and a series of input pulses on input 2 will produce an equivalent series of output pulses on output 5. In no case will a pulse appear on both outputs 4 and 5 simultaneously. Another manner in which this anticoincidence could be obtained would be to drive the two sine tape cams alternately, so that simultaneous scanning, and hence simultaneous generation of output pulses, would be impossible.

The leading and lagging sine tape cam systems 77 and 78 are identical with the ones described in connection with Figures 1 and 2, i. e., the proportionality between the value of the independent variable (angle) and the length of the tape is the same for both. The arc sine tape cam system 88 is fundamentally the same as the sine tape cam systems. In addition to differently spacing the information holes, the stepping relay associated therewith has a few variations due to the two channel input leads to the arc sine cam. Furthermore, the arc sine cam output is limited to represent angles between plus and minus 90° as will be made clear in the ensuing discussion. As in the sine tape cam, to save medium, the holes in the arc sine tape cam are spaced to record the angle for sine values from 0 to 1 and provisions are made to reverse the tape to obtain the other values.

It should be noted that the relation of the scale of the length of the arc sine tape, which corresponds to the value of the sine, to the pulse output from the sine tapes is one to one, i. e., each pulse from the sine tape cam corresponds to an incremental change in the length of the arc sine tape. The total number of sine pulses, which correspond to a change in sine from 0 to 1, when used to drive the arc sine tape cam, thus causes it to be incrementally driven the length of its effective span.

Figure 4 illustrates the relay set-up 25*a* for the arc sine tape cam system 88 where like notation is used for parts similar to the relay set-up for the sine tape cam. Stepping relay shaft 28*a*, for this relay system, has two relay switch arms 48*a* and 48*b*. These arms are rigidly connected to rotate together in the same plane at 90° to each other. Thus, as the switch photocell 35, previously described, energizes relay solenoid 39, the relay switch arms 48*a* and 48*b* rotate to connect to alternate drive solenoids of the tape cam system. The plus and minus terminals 47*a*, 47*b* respectively of these two relay switch arms are connected by flexible leads 90, 91 through a magnetic relay 92 and through input terminals $E_a$ and $E_b$ to the positive and negative input channels 86, 85, respectively, of the arc sine tape cam system. The terminal M of the output photocell circuit 24 is connected in the arc sine system relay 25*a* to one end of magnetic relay arm 93 which is pivoted at 94. Depending on whether the arc sine input pulse is in the positive or negative input channel 86 or 85, magnetic relay 92 becomes energized to rotate magnetic relay arm 93 so that the terminal bar 97 of magnetic relay arm 93 connects to the similarly designated arc sine output channel 100, 101.

The operation of the arc sine cam system when fed by pulses from the sine cam systems can best be described by explaining the operation of the specified angle tape cam computer as a unit to show how the equation of the time-specified trajectory $$h=\sin^{-1}[A+B\cos(y+k)]$$

can be built up from tape cams recorded with comparatively simple mathematical expressions which in this embodiment are the sine and arc sine tape recordings.

It will also be shown that this complex mathematical expression can not only be readily obtained by operating two of the simple recorded cams in parallel and cascading their output so as to form the input to the third; but, by properly setting the tapes to satisfy initial conditions, i. e. parameters, other specified trajectories expressed in this same general family of curves, can be built up by these simple recordings.

Figure 5 shows a plot of the functions generated by the individual tape cams and illustrates the steps in building up the complex mathematical expression therefrom.

Keeping in mind the equation to be solved $$h=\sin^{-1}[A+B\cos(y+k)]$$

the first step of the cam computer, which comprises the two sine tape cams in parallel, is to generate $B\cos(y+k)$.

Theoretically, it can be shown from trigonometry that:

$$B\cos(y+k)=\sin(y+k+c)-\sin(y+k-c)$$

that is to say, multiplying a cosine function by a constant coefficient B is equivalent to subtracting two similar sine functions which are displaced from each other by a phase angle depending on the constant B. Specifically, $$B=2\sin c$$

where $c=\sin^{-1}B/2$ and thus $2c$ is the phase angle difference of the two sine functions.

To physically derive the first step of the computation as above outlined, the sine tape cams, each recorded with the sine of an angle from 0° to 90°, are initially both set with their respective function output photocells, such as 19, positioned over the point on the tape corresponding to an angle $k$. Constant angle $k$ is one of the initial conditions of the unique time specified trajectory which is to be generated.

The leading sine tape cam 77 (Figure 3) is then moved forward along its span (with respect to its function output photocell) an angle equal to $c$; and the lagging sine tape cam 78 is moved backward a similar angular magnitude $c$. On the initiation of the computer system by the closing of switch 71, pulses from pulse generator 70, simultaneously drive, in an incremental fashion, both the leading tape cam system 77 and the lagging tape cam sine system 78. The output channels of each of the individual sine tape cam systems then will have output pulses impressed thereon proportional to the values of the sines of the angles each is sensing on the tape cam.

The relation of the graphs of the sine outputs, generated with respect to time by each of the sine tape cams is shown in graph *5a* of Figure 5.

By connecting the positive and negative output channels 79 and 81, respectively, of the leading sine tape cam 77 to the negative and positive output channels 80 and 82, respectively, of the lagging sine tape cam, as hereinbefore described in connection with Figure 3; and feeding these thusly combined outputs through anti-coincidence devices 84 and 83, the algebraic sum of the pulses impressed on the arc sine positive and negative input channels 86 and 85, respectively, gives the difference of the two sine functions which, as previously shown mathematically, equals $B\cos(y+k)$. In graph *5b*, this latter output is shown plotted along with the function $\cos(y+k)$ to show that the result of the above step was to reduce the amplitude of the cosine of the angle $(y+k)$ by a factor equivalent to B, where B is less than one.

Having procured the pulse stream which is to be used to drive the arc sine tape cam, the operation of the arc sine cam system shown in Figure 3 can now be further explained together with the arc sine relays as illustrated in Figure 4.

The initial setting of the arc sine tape cam 88, which must be satisfied for the particular trajectory which is to be generated, is the introduction of a second parameter A into the solution. Therefore the arc sine tape cam is initially set at a sine value equal to $(A+B\cos k)$. The introduction of this parameter is equivalent to lowering the base line 102 of the graph $B\cos(y+k)$ down a distance A to form a new base line 103 which results in the graph now being defined with respect to the new base line 103, as $A+B\cos(y+k)$.

Referring to graph *5d*, at the instant of closing initiating switch 71, the pulse input to the arc sine tape cam 88 represents point P of the graph *5c*. Now, since the value of this function is decreasing, these input pulses are fed into the negative input channel 85 of the arc sine tape cam system 88 to drive the tape backward. Likewise, the negative arc sine output channel 100, at this instant, is receiving the pulses from the function output photocell, like photocell 19, to give a steadily decreasing output angle as shown by the trace of the function beyond point P′ in Figure *5d*. At point R′, on the latter graph, the terminating hole, like hole 14, in the arc sine tape cam energizes switch photocell, like photocell 35, to cause the stepping relay shaft 28*a* to be rotated a quarter turn and thus connect the still operable arc sine negative input channel 85 (as noted by corresponding point R in graph 5*c*) to the rear drive solenoid 50 to drive the arc sine tape cam forward. The resultant pulse output from the arc sine tape cam, since it is at all times to be controlled by the sign of the input, is still feeding to the negative arc sine output channel 100. At point S' of graph 5*d*, the positive arc sine input channel 86 becomes operable, i. e., pulses emitted from the sine tape cams are impressed thereon. Due to the switch interconnections of arc sine input channel 86, these latter pulses energize the front drive solenoid 52 to drive the arc sine tape backward again. At point T', the terminating hole, like hole 14, again activates switch photocell 35 to again drive the arc sine tape cam forward; the positive arc sine input channel 86 still having the input pulses impressed thereon. Thus for a given input angle $y$, representing the timed independent variable which actuates the cam computer, an output angle $h$, representing the arc sine of a complex mathematical expression is readily obtained. This output angle $h$, expressed as a pulse stream, is thus made available to be fed into the control mechanism (not shown) which physically sets up this angle on board the craft, for example.

As was previously stated, a whole family of trajectories can be computed, by the embodiment of the present device, by specifying the constants or parameters of the equation for the particular trajectory desired; the initial setting of the tape cams introduce these parameters into the system.

Another tape cam embodiment for generating the exponential function is shown in Figure 6. Here a tape cam system similar to the previously described systems is schematically illustrated. This particular tape cam 105 is recorded with function holes, such as holes 18 previously described, so as to represent the exponential function $e^x$ where $x$ is the independent variable whose value is linearly proportional to the length of the tape cam. The exponential tape cam 105 is driven at an arbitrary but fixed rate by an independent pulse source 106 having a knob 107 for setting the rate at which the pulses can be emitted. For this case, the value of the reproduction will vary with the time $t$, or the fixed rate at which the independent variable pulses representing $x$ are received, i. e., the exponential tape cam 105 will reproduce $e^{kt}$ where $kt \approx x$, and $k$ is a constant. If the exponential tape cam 105 is initially offset with its function output photocell, such as photocell 19 previously described, placed above it at an initial value of $e^{ka}$, a distance along the tape cam corresponding to $k^a$, the tape cam will reproduce $$e^{k(t+a)} = e^{kt}e^{ka} = Ae^{kt}$$

where $A = e^{ka}$. Thus it is shown how the present invention enables a simple recording of an exponential function to be multiplied by a constant by initially off-setting the exponential tape recorded cam with respect to its function output photocell.

As a further example of the manner in which the present invention can generate relatively complex functions from a plurality of simpler functions, the manner of physically generating the power series is shown in Figure 7. It is well known in mathematics that certain useful functions can be approximately represented by a polynomial, in general a power series polynomial of $n$th degree which is represented mathematically as $$f(x) = A_0x^n + A_1x^{n-1} + \ldots A_{n-1}x + A_n$$

A general, flexible computer can be provided for solving this function by having a plurality of tape cam systems in accordance with the present invention, each recorded with one of the functions; $x$, $x^2$, $x^3$, $x^4$ . . . $x^n$. These tape cams are all arranged in parallel as shown in Figure 7 and thus simultaneously driven by a common independent variable pulse actuator 109. The outputs of all of the tape cams are fed through an anticoincidence device 110 from which they are all fed out, properly temporally spaced in accordance with output signals from other tape cams, to give a pulse time representation of the function being generated.

It should be noted that anti-coincidence device 110 has the same nature as anti-coincidence devices 83 and 84 (Figure 3). Its purpose is to assure that no pulses are lost due to coincidences in the process of mixing the output pulses from the multiplicity of tape cams. A number of coincidence devices, of the form of coincidence devices 83 and 84 (Figure 3) may be coupled together to provide assurances against coincidences from any number of output lines. It is readily apparent that the conversion of anti-coincidence devices 84*a* (Figure 3) into more conventional form by the coupling of output lines 4 and 5 through a mixer tube $M_2$ is an example of an anti-coincidence device pertinent to 4 tape cam output lines.

By starting each of the tape cams $x$, $x^2$, $x^3$ etc., with an initial offset or initial value $a_1$, $a_2$, $a_3$, etc., respectively, each produces pulse streams representative of the functions:

$$(x-a_1),\ (x-a_2)^2,\ (x-a_3)^3$$

etc. By adding these pulse streams together the function desired is obtained.

It should be noted that the constants $a_1$, $a_2$, etc., which represent the initial setting of each of the tape cams must be calculated by a mathematician using the parameters $A_0$, $A_1$, etc., chosen for the particular solution of the general function which is desired.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

The present application utilizes the cams and associated apparatus shown, described and claimed in my prior filed application, Serial No. 51,563, filed September 28, 1948, and entitled "Linear Cam Computer."

What is claimed is:

1. In a device for computing a complex function composed of a plurality of simpler functions, the combination of a plurality of tape cams, signal indications recorded on each of said tape cams, individual signal-sensing means associated with each of said tape cams, means of summing said signal indications, said summing means connected to said sensing means, the summed value of said signal indications corresponding to one of said simpler functions, external means for driving said tape cams, means for driving each of the remaining tape cams in accordance with output signals generated in said sensing means associated with other tape cams, output means for conveying out resulting signals generated in at least one of said sensing means, said resulting signals having summed values corresponding to said complex function.

2. Apparatus in accordance with claim 1 wherein the magnitude of the independent variable of each of said simpler functions is proportional to the length of said tape cam upon which said signal indications characterizing said simpler functions are recorded, and wherein each of said signal indications corresponds to a fixed increment of the dependent variable, and wherein said signal indications are positioned along said tape cam in accordance with the rate of change of said function, and wherein said sensing means effects resulting output signals by electronic means.

3. Apparatus in accordance with claim 1 wherein said signal indications on each of said tapes correspond to both the magnitude and the sign of the fixed incremental value of the dependent variable, and wherein said sensing means effects resulting output signals by electronic means.

4. Apparatus in accordance with claim 1 wherein said signal indications on each of said tape cams correspond to both the magnitude and sign of the fixed incremental value of the dependent variable, and wherein means are provided for controlling the sign of said dependent variable signal indications generated by said sensing means in accordance with the sign signals generated by said sensing means and wherein said sensing means effects resulting output signals by electronic means.

5. A computer for generating a complex function from a plurality of simpler functions comprising a first and second sine tape cam, signals recorded on each of said tape cams, an arc sine tape cam including signals recorded thereon, sensing means cooperating with each of said tape cams, said first sine tape cam being displaceable by an amount equal to a phase angle from an initial reference angle, said second sine tape cam being displaceable by an equal amount in opposite sense from said reference angle, means for incrementally driving said first and second sine tape cams, means for setting said arc sine tape cam at an initial sine value, means for incrementally driving said arc sine tape cam in accordance with the summed output from the sensing means of both said sine tape cams, means for conveying the output from the sensing means of said arc sine tape cam, said latter output having summed values corresponding to the complex function being generated.

6. Apparatus in accordance with claim 5 wherein the length of each of said sine tape cams corresponds to the value of an angle from 0° to 90°, the length of said arc sine tape cam corresponds to the value of a sine from 0 to 1, and means are provided for reversing said tape cams for obtaining a greater range of generation of the functions, and wherein said sensing means effects resulting output signals by electronic means.

7. Apparatus in accordance with claim 5 wherein means are associated with each of said tape cams for controlling the sign of said outputs from said sensing means, and wherein said sensing means effects resulting output signals by electronic means.

8. Apparatus in accordance with claim 5 wherein sign signals for determining the sign of said function signals are located on said tape cams, sign sensing heads are provided for detecting said sign signals, a positive and negative output channel associated with the sensing means of each of said tape cams, switching means triggered by said signal from said sign sensing head for connecting the output generated in said sensing means to opposite output channels, and wherein said sensing means effects resulting output signals by electronic means.

9. In a computer, a plurality of tape cams, signals representative of a mathematical function recorded on each of said tape cams, each of said tape cams being initially adjustable in accordance with the value of the coefficients for the particular solution desired, a summing means connected to said sensing means for representing summed values of said signals on each of said tape cams, sensing means associated with each of said tape cams for generating an output signal resulting from the movement of said tape cam past said sensing means, driving means for each of said tape cams, an external source of signals for actuating said driving means of such of said tape cams as require independent driving means, output signals from generating means associated with said tape cams for actuating the remaining driving means, and means for conveying output signals, representing the function generated, from one of said tape cams.

10. In a device for generating a star navigational function of a great circle trajectory expressed as $$h=\sin^{-1}[A+B\cos(y+k)]$$

the combination of a first sine tape cam and a second sine tape cam, said first sine tape cam being initially set by the operator prior to operation time of the machine at an angle $(k+c)$ and the said second sine tape cam being singularly set at an angle $(k-c)$, a driving means connected to said sine tape cams, said sine tape cams having signals thereon which when summed correspond to the sine of an angle $y$, a source of timed electrical pulses representative of an angle $y$ connected to said driving means, which progresses both said sine tape cams in accordance with said timed pulses, means responsive to said summed signals on each of said tape cams for generating pulses representative of the sine, means for feeding out said latter pulses as positive and negative pulses in accordance with the sign of said sine value, means for combining positive pulses of one sine tape cam with negative pulses of the other sine tape cam whereby the algebraic sum produces $B\cos(y+k)$, an arc sine tape cam, said arc sine tape cam having signals thereon which when summed correspond to the angle $h$, said arc sine tape cam being initially set by the operator prior to operation time of the machine at a sine value of $(A+B\cos k)$, means for progressing said arc sine tape cam in accordance with said positive and negative pulses from said first and second sine tape cams and sensing means responsive to said summed signals on said arc sine tape cam for generating pulses representative of the angle $h$.

11. In a computing device for generating a function expressed as a power series, the combination of a plurality of tape cams, each of said tape cams recorded with a signal when summed representative of a dependent variable corresponding to: $x$, $x^2$, $x^3$, etc., respectively, external means for simultaneously actuating all of said tape cams, means for sensing the recordings of each of said cams, each of said tape cams being initially offset by the operator prior to operating time of the machine with respect to its sensing means, and means for feeding the outputs of all of said sensing means into a common output representing the function.

References Cited in the file of this patent

UNITED STATES PATENTS

| | | |
|---|---|---|
| 2,254,932 | Bryce | Sept. 2, 1941 |
| 2,436,178 | Rajchman | Feb. 17, 1948 |
| 2,444,549 | Anderson | July 6, 1948 |
| 2,481,648 | Dehn | Sept. 13, 1949 |
| 2,582,588 | Fennessy | Jan. 15, 1952 |

FOREIGN PATENTS

| | | |
|---|---|---|
| 607,397 | Great Britain | Aug. 30, 1948 |